Aug. 7, 1951 A. M. ROBERTS 2,563,069
POWER OPERATED HACK SAW
Filed May 29, 1948 3 Sheets-Sheet 1

INVENTOR.
Alfred M. Roberts,
BY
ATTORNEY.

Aug. 7, 1951  A. M. ROBERTS  2,563,069
POWER OPERATED HACK SAW
Filed May 29, 1948  3 Sheets-Sheet 2
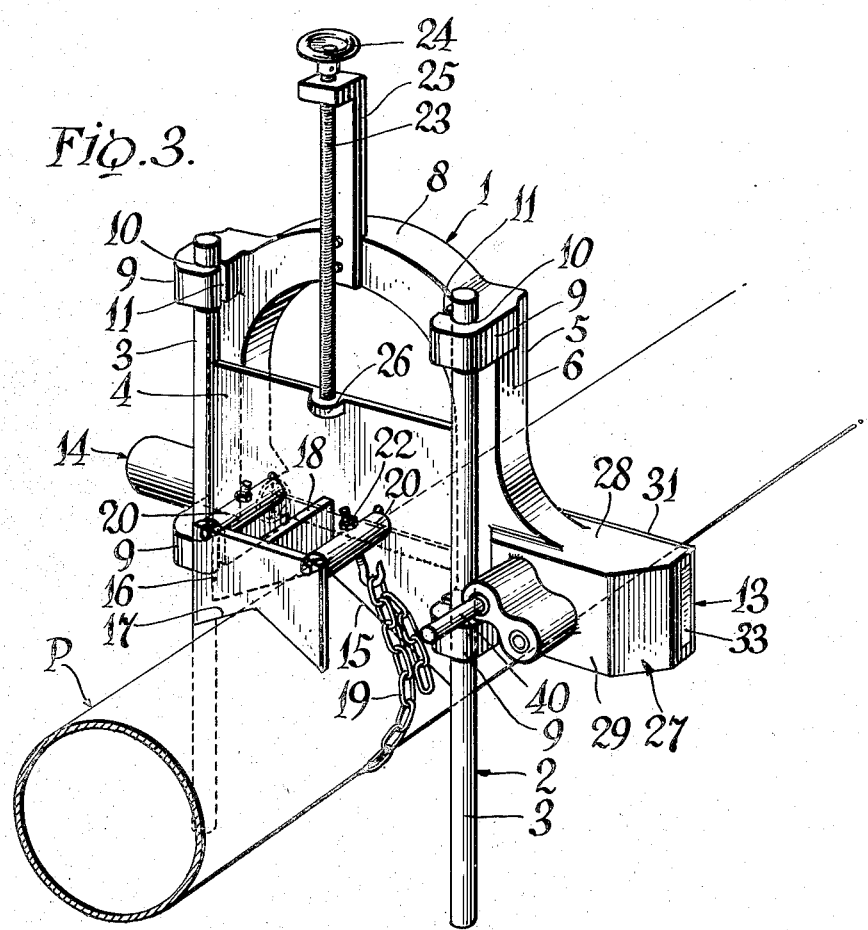
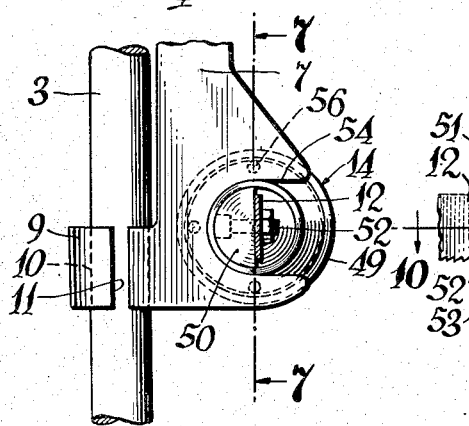
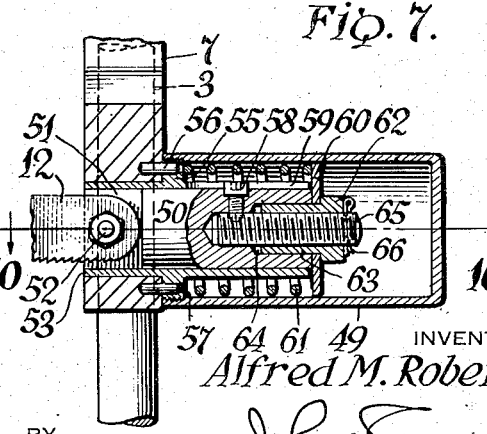
INVENTOR.
Alfred M. Roberts,
BY John Towers,
ATTORNEY.

Aug. 7, 1951  A. M. ROBERTS  2,563,069
POWER OPERATED HACK SAW
Filed May 29, 1948  3 Sheets—Sheet 3
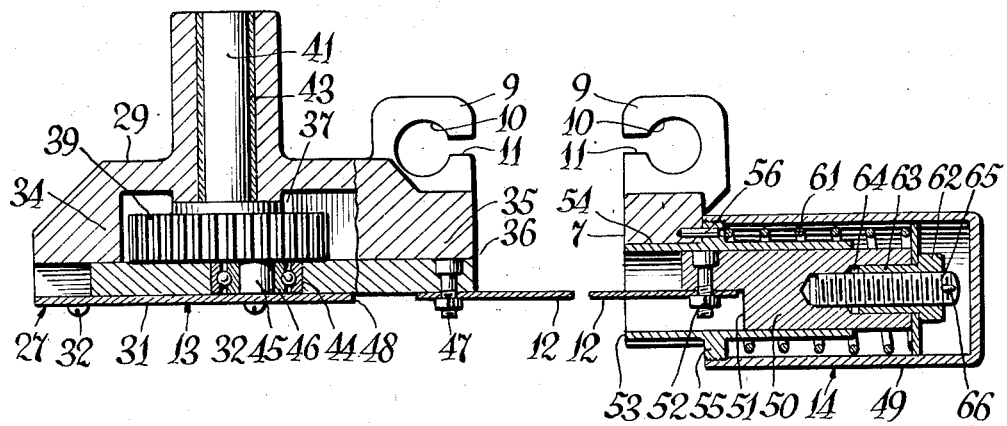
Fig. 9
Fig. 10
Fig. 8
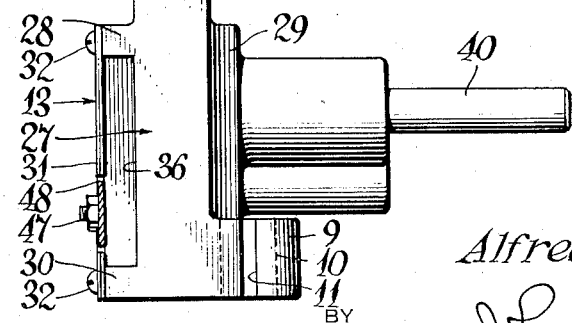
INVENTOR.
Alfred M. Roberts,
BY John Lowers.
ATTORNEY.

Patented Aug. 7, 1951

2,563,069

UNITED STATES PATENT OFFICE 2,563,069

POWER-OPERATED HACK SAW

Alfred M. Roberts, Hamburg, N. Y.

Application May 29, 1948, Serial No. 30,128

8 Claims. (Cl. 29—73)

This invention relates to improvements in power operated hack saws and proposes a construction which is especially applicable for use in the repair of pipe lines in situ, e. g., water or gas lines, in such operations as the substitution of new sections for rusted or broken sections or the repair, replacement or original location of valves.

In such operations, in the absence of a manhole, a ditch must be dug to expose the section of the line in which the repair is to be made. Heretofore workmen, positioned in the ditch or man-hole, have cut the pipe sections with manually operated hack saws. The work has been very laborious and time consuming and, therefore, highly uneconomical. Moreover, the workmen, conducting the manual sawing operations in restricted space, and frequently in cramped positions, have been subject to undue physical discomfort. If, as frequently happens, the ditch contains water, the physical discomfort of the workman is increased by the necessity of squatting, crouching or stooping, with his feet in the water or mud, for the prolonged periods required by the work.

The structural characteristics of standard power driven hack saws are such that they cannot be used in the environment described for repairs of the character described. Within a long career devoted to municipal water and gas engineering projects I have not become aware of any power driven hack saw which can be satisfactorily used for the repair of pipe lines in situ.

Power driven hack saws in accordance with the invention will be made in various sizes, each appropriate for a particular range of diameters of pipe sections; and in each instance will be available for a wide range of diameters. Thus the smallest size will be available, for example, for pipes from four to eight inches in diameter; the next larger size for pipes from six to fourteen inches in diameter; the next larger size for pipes from twelve to twenty inches in diameter; the next larger size for pipes from eighteen to twenty-four inches in diameter; and so on through the range of larger diameters.

A power driven hack saw in accordance with the invention, and for the purpose of the use described, is characterized: (1) by a guide unit and an associated hack saw unit movable relatively to the guide unit, the guide unit being securely clamped to the pipe and being of such construction that it effectively maintains the alinement of the saw with the kerf, resisting any tendency of the combined units toward twisting about a vertical axis, canting about a horizontal axis, or displacement relatively to the pipe as an axial center; (2) by the compactness of the units and their compendious association whereby the saw may be used in ditches of no greater extent than has heretofore been required, according to the diameter of the pipe section to be repaired, for manual hack saw operations; (3) by the arrangement of the clamping elements wholly at one side of the saw whereby, as circumstances may require, a cut may be made very close to the end of a pipe or to a valve or fitting; (4) by the direct application of power to an end of the saw whereby the utilization of power is optimum and disadvantageous conditions of leverage and torque are avoided; (5) by the direct application of power to one end of the saw to effect movement thereof in both directions coupled with the association with the opposite end of the saw of means for maintaining the saw at all times under tension, thereby to prevent buckling, whipping or back-lash; (6) by the provision for a very short stroke of the saw as compared with the strokes of standard power operated hack saws, namely a stroke, according to the size of the saw, within a range of from one to two inches, whereas standard power operated hack saws have a minimum stroke of the order of six inches, and by the provision of a very rapid operating speed, co-ordinated to the length of the stroke, for example for a one inch stroke of the order of 400 reciprocations per minute and correspondingly somewhat less for strokes of greater length, whereas standard power operated hack saws have for their minimum stroke an operating speed of the order of 100 reciprocations per minute, these features greatly contributing to the compactness of the construction and enabling the time of the sawing per inch to compare favorably with the time of sawing per inch of a standard power driven hack saw with its much longer stroke; (7) by the provision for the reciprocation of the saw element in a plane parallel to the common plane of the guide standards of the guide unit, thereby to eliminate any possibility of the lateral displacement of the pipe during the sawing operation; (8) by the provision of means for positively controlling the feed of the saw into the kerf, thereby to take the direct weight of the saw unit from the ends of the kerf and to minimize liability of binding; (9) by a hack saw unit of maximum simplicity and lightness of weight whereby the unit is readily portable from one position to another in the course of the particular repair job; (10) by the separability of the guide unit and the hack saw unit and provision for their quick and facile association in operative relation and disassociation from operative relation; and (11) by the provision for the ready disconnection of the hack saw unit from the saw element, whereby on any rare occasion that the saw element may become jammed it may be left in the kerf from which it can be readily removed, and by the provision for the quick and facile replacement of the saw element, or the substitution of a new saw element, in operative relation in the hack saw unit.

By virtue of the above characteristics a power driven hack saw in accordance with the invention accomplishes its work rapidly and efficiently, effecting a great saving of time as compared with manual hack saw repair operations, requires but minimum power, minimizes the liability of the jamming of the saw element, may be readily and quickly restored to operative relation if, for any mechanically unpreventable cause, jamming of the saw element should occur, is readily portable from point to point in the course of a particular repair job, may be readily and quickly set up with its parts in operative relation to the pipe to be repaired, saves much time of the workman, and spares the workman the physical discomfort attendant upon manual hack sawing in repairing pipes in situ.

In the accompanying drawings:

Figure 3 is a front perspective view thereof.

Figure 6 is a detail elevation of the inner face of the leg of the hack saw unit with which is associated the means for maintaining the saw under tension, the saw element being shown in section.

Figure 7 is a detail longitudinal sectional view on the line 7—7 of Figure 6.

Figure 8 is a fragmentary elevation looking at the inner vertical face of the leg of the hack saw unit with which is associated the means for applying power to the hack saw element.

Figure 9 is a detail horizontal section on the line 9—9 of Figure 4 but showing the eccentric yoke at the inward limit of its motion.

Figure 10 is a detail horizontal section on the line 10—10 of Figure 7 but showing the hack saw element in a position corresponding to the position in which it is shown in Figure 9.

Figure 4:
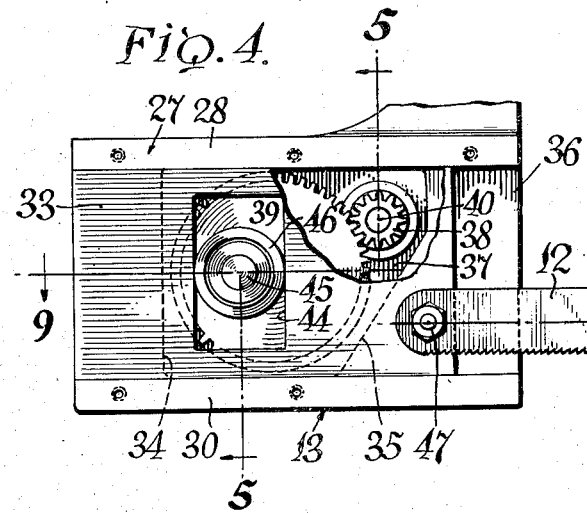
Figure 4 is a side elevation, partly broken away and with a cover plate removed, showing the mechanism for effecting the reciprocation of the saw element, the eccentric yoke being shown at the outward limit of its motion.
Figure 5:
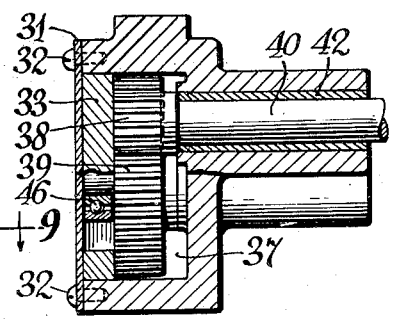
Figure 5 is a cross section on the line 5—5 of Figure 4.

Figures 9 and 10 are arranged in juxtaposed position in the drawing and connected by a bracket to indicate that together they may be taken as a horizontal section across the machine along the combined lines 9—9 of Figure 4 and 10—10 of Figure 7.

The construction includes a hack saw unit, indicated generally at 1, and a guide unit indicated generally at 2.

The guide unit comprises a pair of upright guide standards 3 which are connected and mutually braced by a transverse plate 4, the ends of the plate 4 being rigidly connected, as by welding, to the standards 3 and the plate being arranged at an elevation with respect to the standards 3 such that its position will be above the pipe P to be repaired. The hack saw unit includes a frame 5 of substantial inverted U-shape, the frame consisting of a pair of vertical legs 6 and 7 and a cross bar 8 extending between, and connecting, the upper ends of the legs 6 and 7. The legs 6 and 7 are each provided on their front faces with a pair of lower and upper guide lugs 9 which are each formed between their upper and lower faces with an opening 10 to take over the standards 3. The openings 10 conform to the cross sectional outline and dimensions of the standards and each communicates with a vertical slot 11 which extends to the inner face of the lug 9 and provides a clearance to accommodate the plate 4, thereby to enable the hack saw unit to be moved in either direction along the posts 3 through such extent as may be required. With the lugs 9 fitted upon the standards 3, the two units will be rigidly coupled against displacement in all directions except relative sliding displacement in either direction of the standards. The hack saw unit is freely slidable in either direction along the standards 3 and the two units may be quickly and easily separated simply by pulling the standards from the lugs 9 and as easily and quickly restored to operative relation by inserting the standards through the lugs 9 to the required extent.

The hack saw element 12, in the form of the usual fine-toothed blade, extends transversely between the lower ends of the legs 6 and 7 and is mounted for transverse reciprocation relatively to the frame 5. As will be later described, the hack saw element 12 is mounted in a truly horizontal position and is at all times positively maintained for reciprocation in a truly horizontal path. The plane in which the saw element 12 reciprocates is parallel to the common plane of the standards 3. The power for the operation of the element 12 is applied directly to one end thereof, the power applying mechanism, designated generally as 13, being mounted at the lower end of the leg 6 and forming a part of the hack saw unit. The mechanism 13 is cooperative with a tensioning mechanism, designated generally at 14, which is mounted at the lower end of the leg 7, forms a part of the hack saw unit, and is directly connected to the end of the element 12 opposite to the end to which power is applied.

The guide unit 2 is rigidly clamped to and upon the pipe P. One element of the clamp consists of a "saddle" which comprises a pair of plates having their lower edges of inverted V formation for two-point engagement with the pipe. The plate 4 above described, is utilized as one of the saddle plates, its lower edge of inverted V-shape being indicated at 15. The second saddle plate 16 has a lower edge of inverted V-shape as indicated at 17. The plate 16 is located behind the plate 4 and the two are rigidly connected, preferably by a central web 18. The extent of the V-shaped edge 17 accords with the particular range of diameters of pipe sections for which, according to its size, the hack saw is designed to be used. The edges 15 and 17 are of the same angularity and corresponding legs of their V's are co-planar. Thus when the saddle is fitted to the pipe P the two plates 4 and 16 will conjointly provide four points of clamping contact with the pipe, these points preferably delimiting a rectangle. The element of the clamp companion to the saddle consists of a chain 19 connected to the saddle and which is drawn tight about the pipe in order to cooperate with the plates 4 and 16 in exerting clamping pressure upon the pipe.

The means of connection between the chain 19 and the saddle includes a pair of rockably mounted bars 20 having end trunnions for which the plates 4 and 16 are formed to provide bearings, the bars 20 extending in parallel relation between these plates. The bars 20 each carry a downwardly projecting hook 21, the threaded shanks of which extend through openings formed diametrically in the bars with their upper portions projecting beyond the bars and provided with retaining and take-up nuts 22. The chain 19 is looped about the pipe P in opposition to the saddle and drawn as tightly as possible manually against the pipe whereupon links thereof are engaged with each of the hooks 21. Any initial slack is taken up by adjusting the hooks 21 upward relatively to the bars 20, such adjustment being effected by turning the nuts 22 as far as possible in the appropriate direction. At such time the chain 19 is bound with the utmost security against the pipe and, in cooperation with the plates 4 and 17, effects the clamping of the guide unit to the pipe with such rigidity that displacement of the guide unit in any direction is prevented. Since the guide unit and the hack saw unit, as fitted upon the standards 3, are rigidly coupled against displacement in all directions, the alinement of the hack saw element with respect to the kerf which it forms in the pipe will be positively maintained.

The hack saw unit is movable by gravity downward along the standards 3. However, it is preferred not to rely on gravity for the downward feed of the hack saw element during the sawing operation but instead to provide for the positive control of the downward movement of the hack saw unit progressively with the sawing operation. For this purpose it is preferred to provide a feed control screw 23 which carries a hand knob 24. The screw 23 is vertically arranged at the center of the hack saw unit and has threaded engagement in the projecting arm of a supporting bracket 25 secured at a central location to the cross bar 8 of the frame 5 and projecting upward from the cross bar. The upper end of the screw 23 carries the knob 24 and its lower end engages a lug 26 carried by and projecting forward from the plate 4. The lug 26 thus provides vertical support of the saw unit from the guide unit. During the sawing operation the attendant in charge of the repair work grasps the knob 24 and turns the screw 23 in a direction appropriate to effect the downward sliding movement of the saw unit relatively to the guide unit. The turning of the screw 23 to effect the downward feed of the saw unit is at a rate such that it will at once maintain the hack saw element 12 in appropriate contact with the ends of the progressively deepening kerf and will prevent the weight of the hack saw unit from being taken by the ends of the kerf. The rate at which the screw 23 is turned for these purposes will be readily determined by the attendant from the sound made by the element 12 in the sawing operation and also from the "feel" transmitted to his hand through the knob 24.

The reciprocation of the hack saw element in a positively maintained truly horizontal path and in a plane parallel to the common plane of the guide standards 3, the constant positive maintenance of its alinement with the kerf progressively with its deepening and the positive control of the downward feed of the saw unit eliminate all liability of the jamming or binding of the hack saw element except for mechanically unpreventable causes.

When the cut has been completed the screw 23 is turned to lift the hack saw unit relative to the guide unit to a position in which the hack saw element clears the pipe P. The chain 19 is then disengaged from the hooks 21 and the saw is moved along the ditch D (or within the chamber normally closed by a man-hole cover) to the position required for the next cut to be made in the pipe, the guide unit thereupon being again clamped to the pipe as above explained. In thus shifting the position of the saw, the guide unit and hack saw unit may be left in connected relation or they may be separated, according to convenience. In smaller sizes the weight of the two units will not be such as to interfere with their ready portability in connected relation. In larger sizes it may be preferable to disconnect the units, the weight of each of which is not such as to interfere with their ready separate portability.

The mechanism 13 for the operation of the saw element 12 is arranged within a housing designated generally as 27 and consisting of connected top, side and bottom walls 28, 29 and 30, respectively, and a cover plate 31 in a plane parallel to the plane of the side wall 29 and removably secured by screws 32 to the lateral faces of the walls 28 and 30. The housing thus constituted is rigidly secured to the lower portion of the leg 6 from which it projects laterally outward, the walls 28, 29 and 30 being preferably cast integrally with the leg 6. The mechanism 13 includes a reciprocatory yoke 33 mounted within the housing 27 and preferably in the form of a vertical rectangular plate mounted for transverse reciprocating movement between the walls 28 and 30 as upper and lower guides. The lateral guides for the yoke 33 are the cover plate 31 and webs 34 and 35 (Figures 4, 8 and 9) integrally cast with the walls 28, 29 and 30 of the housing 27. The walls 28 and 30, the cover plate 31 and the webs 34 and 35 delimit a way in which the yoke 33 is reciprocatory, this way being open as at 36 (Figures 4 and 8) to the inner vertical face of the leg 6.

The walls 28, 29 and 30, the yoke 33 and the webs 34 and 35 delimit a chamber 37 for the reduction gear which, in combination with the yoke, constitutes the mechanism 13. The reduction gear consists of a small pinion 38 and a meshing larger pinion 39 in appropriate ratio. The pinions 38 and 39 are mounted upon the ends of shafts 40 and 41, respectively. The wall 29 is formed with projecting sleeves 42 and 43 which provide bearings for the respective shafts 40 and 41. The shaft 40 projects for a suitable extent beyond its bearing sleeve 42 and is suitably connected, as by a flexible shaft (not shown), to a source of power, e. g., an electric motor (not shown). The plate which constitutes the yoke 33, and in its capacity as such, is formed with a rectangular opening 44 and the pinion 39 is provided with a wrist-pin 45 cooperative with the opening 44, the wrist-pin preferably carrying a standard ball bearing 46, the outer ring of which engages the walls of the opening 44. In the rotation of the pinion 39 the wrist-pin 45 via the ball bearing 46 and the opening 44 effects the reciprocation of the yoke 33 in the obvious and well known manner and the yoke 33 in its reciprocation moves through the opening 36.

Figure 1:
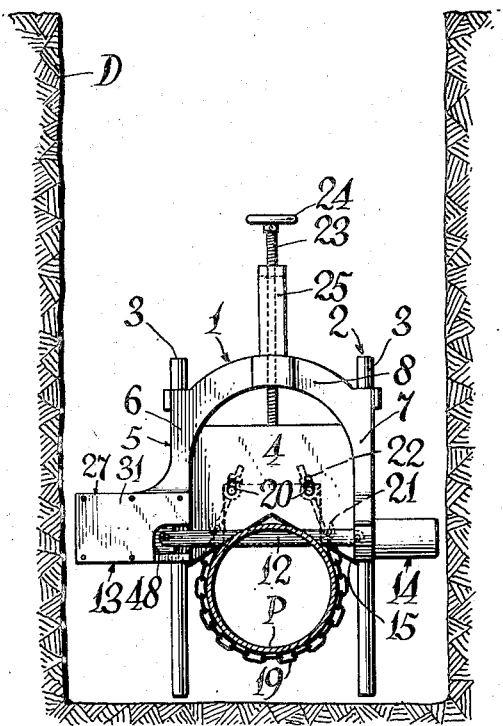
Figure 1 is a rear elevation of a power driven hack saw in accordance with the invention, and as in use.
Figure 2:
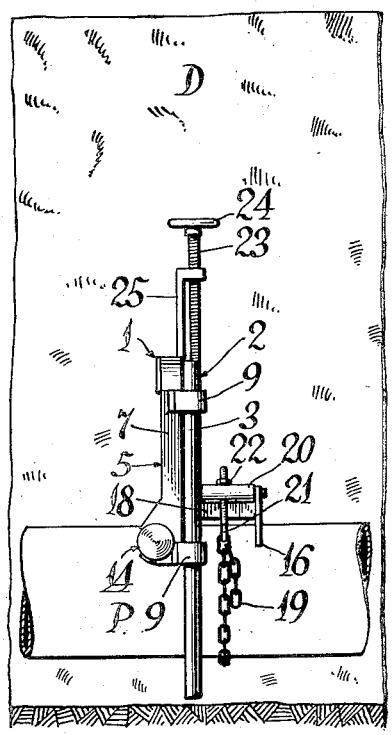
Figure 2 is a side elevation thereof.

The hack saw element 12 at one end is connected by a bolt fastening 47 (Figures 4, 8 and 9) to the yoke 33 adjacent its outer face, the plate 31 being provided along its inner vertical edge with a recess 48 (Figure 1) as a clearance for accommodating the adjacent end portion of the hack saw element 12 and the screw 47.

The reduction gearing 38—39 and the yoke 33 to which the hack saw element 12 is directly connected by the screw 47 provide for the reciprocation of the hack saw element by power directly applied to one end thereof. It will be seen that thereby there is an optimum utilization of power and that disadvantageous conditions attendant upon considerations of leverage and torque are eliminated.

The tensioning mechanism 14 is mounted upon the leg 7 at its lower end and is arranged within a housing 49 which projects laterally outward from the leg. The tensioning mechanism includes a saw head 50 in the form of a cylindrical block provided at its inner end with a recess 51 which affords a clearance for the adjacent end of the hack saw element 12. Within the recess 51 the element 12 is connected to the head 50 by a bolt fastening 52, the recess 51 having a flat vertical face against which the end of the hack saw element bears. The head 50 is mounted to reciprocate in a guide sleeve 53, the inner end portion of which is fitted in a recess 54 at the lower end of the leg 7. The sleeve 53 projects laterally outward beyond the leg 7 and is formed with a circumscribing collar 55 which bears against the outer side face of the leg. The collar 55 is externally threaded and the casing 49 is formed at its inner end with internal threads to engage the threads of the collar, the latter being thereby utilized to provide support for the housing. The sleeve 53 is held against displacement about its axial center and also against displacement from the recess 54 by pins 56 carried by and projecting laterally outward from the sleeve 7 and engaging in openings 57 in the collar 55. The saw head 50 is held against displacement about its axial center by a radially projecting pin 58 by which it is slidably keyed to the sleeve 53, the companion keying element consisting of a longitudinal slot 59 in the sleeve 53 and which extends to its outer end, the projecting part of the pin 58 slidably engaging in the slot 59. A ring 60 is confined against the outer end of the head 50 and projects outward beyond the head to provide an abutment for a helical compression spring 61, the companion abutment for the spring 61 being provided by the collar 55. The ring 60 is held against the head 50 by a nut 62 having a sleeve-like extension 63 which fits within an axial recess 64 at the outer end of the head 50. The recess 64 is countersunk to accommodate a screw 65 upon which the nut 62 is mounted, the nut being internally threaded for engagement with the threads of the screw.

The screw 65 is made fast to the saw head 50 whereby it will not turn about its axial center or become axially displaced. For this purpose the pin 58 is utilized and is in the form of a screw, the end of which engages a recess in the screw 65 and the head of which engages in the slot 59. The nut 62 is normally held against turning upon the screw 65 by any suitable means, for example a cotter pin 66 bearing against the outer face of the nut and fitted in a diametrical opening in the outer end portion of the screw 65.

The compression spring 61 reacts against the ring 60 to maintain the hack saw element 12 at all times under tension and also reacts against the collar 55 to hold the sleeve 53 properly positioned upon the leg 7, in other words to hold the collar against the outer face of the leg and thereby to maintain the engagement of the pins 56 in the openings 57.

The bolt fastenings 52 and 47 are in horizontal alinement whereby the hack saw element is supported in a true horizontal position and is reciprocatory in a true horizontal path. This relation is maintained at all times because the mechanisms 13 and 14 are supported by rigid parts of the frame 5 of the hack saw unit, and therefore, as the hack saw unit is fed downward by the manipulation of the screw 23 during the progress of the sawing operation the mechanisms 13 and 14 will move downward to an equal extent through positively maintained parallel vertical paths, all possibility of the hack saw element 12 being displaced from a horizontal path or of bearing more strongly at one end of the kerf than at the other being thereby positively eliminated.

If for any mechanically unpreventable cause the hack saw element 12 should become jammed the hack saw unit may be quickly and easily disconnected from the hack saw element, leaving the latter in its kerf from which it may readily be removed, and the jammed hack saw element, upon removal from its kerf, if fit for continued use, may thereupon be quickly and easily reconnected to the hack saw unit, or if necessary, a new hack saw element may be substituted. The disconnection of the hack saw unit from a jammed hack saw element 12 is as follows; the several steps being set forth in their order: One of the hooks 21 is backed off to slacken the chain 19 and permit its disengagement; the housing 49 is disconnected from the collar 55; the bolt fastening 47 is disconnected to free the hack saw element 12 from the yoke 33; the cotter pin 66 is removed and the nut 62 is backed off to an extent sufficient to relieve the compression of the spring 61 to a degree such that the sleeve 53 may be pulled away from the leg 7 until the pins 56 are cleared; and the frame 5 of the hack saw unit 1, carrying with it the mechanism 13 in its housing 27 and also carrying with it the guide unit 2, pulled away from the hack saw element 12, in the axial direction of the pipe P, until the recess 54 has cleared the sleeve 53. At such time the jammed hack saw element 12 will be left in its kerf with the head 50 attached to it and the sleeve 53, spring 61, ring 60 and nut 62 in association with the head. As thus freed from the hack saw unit the jammed hack saw element 12 may be readily removed from its kerf and, if in condition for further use, left connected to the head 50 and then, with the frame 5 raised by the screw 23 to a suitable elevation above the pipe P, reconnected to the yoke 33 by the fastening 47, the parts of the tensioning mechanism then being reapplied to the leg 7 and restored to their normal operative relation. The housing 49 is then replaced and the saw is properly repositioned upon the pipe P and clamped thereto whereupon the hack saw unit is lowered to reintroduce the hack saw element into the kerf to the extent sufficient to enable the continuance of the sawing operation. If the jammed hack saw element 12, upon its removal from the kerf, is found to be not in condition for further use, the sleeve is pulled back upon the head 50 to an extent sufficient to expose the bolt fastening 52 and enable its disconnection in order to free the hack saw element from the head 50. A new hack saw element is then substituted. In some cases, having freed the hack saw element from the jammed hack saw unit in the manner above described, it may be found preferable in any event to substitute a new hack saw element and clamp the saw in a different position upon the pipe P, close to its former position, say for example, one-quarter of an inch away and start a new kerf.

I claim:

1. A power operated hack saw for use in the repair of pipe lines in situ comprising, in combination, companion guide and hack saw units, the guide unit being provided with parallel vertical guide standards for location at opposite sides of the pipe to be repaired and the hack saw unit being provided with guide lugs having openings to take over the standards, the hack saw unit thereby being slidable relatively to the guide unit in either direction of the standards and parallel thereto and being otherwise rigidly connected to the guide unit, means rigidly connected to the guide unit for rigid clamping engagement with the pipe to be repaired, the hack saw unit including fixed parallel vertical legs extending adjacent opposite sides of the pipe to be repaired and located at one side of the guide standards and a cross bar rigidly connecting the legs and located above the pipe to be repaired, the legs being in a plane parallel to the common plane of the guide standards, a hack saw element extending transversely between and operatively movable relatively to the lower ends of the legs, power operated actuating means carried by one of the legs and including a reciprocatory element directly and detachably connected to an end of the hack saw element for effecting its transverse reciprocation, said reciprocatory element directly applying power to the hack saw element, and means carried by the other leg and connected to the opposite end of the hack saw element for maintaining it under constant tension, said actuating means and said tensioning means serving for the support of the hack saw element in its position between and transversely of the legs.

2. A hack saw as set forth in claim 1 wherein a vertical screw is provided for regulating the downward feed of the hack saw unit, the hack saw unit is provided with a bracket having threaded engagement with the screw and the guide unit is provided with a lug against which the screw bears at its lower end.

3. A hack saw as set forth in claim 1 wherein the guide unit includes a transverse plate extending between and rigidly connected to the standards and located behind the hack saw element and a second transverse plate located behind the plate first named and rigidly connected thereto, each of the plates having its lower edge of inverted V-shape to provide two-point clamping engagement with the pipe to be repaired, the guide lugs having slots to accommodate said first named plate during the movement of the hack saw unit along the guide standards.

4. A hack saw as set forth in claim 1 wherein the actuating means includes a gear driven reciprocatory yoke directly attached to the hack saw element and the leg which carries the actuating means is provided with a housing which projects laterally outward and by which the yoke is supported and guided in its reciprocatory movement.

5. A hack saw as set forth in claim 1 wherein the actuating means includes a gear driven reciprocatory yoke, disconnectable means is provided for the direct attachment of the hack saw element to the yoke, the means for maintaining the hack saw under tension consists of a saw head in the form of a block which is directly connected to the hack saw element, a guide for the saw head in which it is reciprocatory, and compression spring means at all times acting on the saw head, disconnectable means is provided for the direct attachment of the hack saw element to the saw head, the leg which carries the means for maintaining the hack saw element under tension is provided with a recess in which the guide is mounted and from which it is removable, and means is provided for normally holding the guide in the recess of the leg.

6. A hack saw as set forth in claim 1 wherein the hack saw unit and the guide unit are freely separable, the hack saw element is detachably connected to the actuating means and to the means for maintaining it under tension and the means for maintaining the hack saw element under tension is separable as a unit and in attached relation to the hack saw element from the leg by which it is carried.

7. A power operated hack saw for use in the repair of pipe lines in situ comprising, in combination, companion guide and hack saw units having cooperating elements by means of which the hack saw unit is slidable vertically in either direction relatively to and parallel to the guide unit and is otherwise rigidly connected to the guide unit, the hack saw unit including fixed parallel vertical legs and a horizontal reciprocatory hack saw element extending transversely between and movable relatively to the lower ends of said legs, means for the direct application of operating power and tensioning power to the ends of the hack saw element, said means being carried by the legs of the hack saw unit, supporting the hack saw element and prescribing its reciprocation in the direction of its extent and means for rigidly clamping the guide unit to the pipe to be repaired.

8. A hack saw as set forth in claim 1 wherein the guide unit includes a transverse plate extending between and rigidly connected to the standards and located behind the hack saw element the guide lugs having slots to accommodate said plate during the moving of the hack saw unit along the guide standards and the means for clamping engagement with the pipe is carried by the plate and is arranged wholly at one side of the hack saw element.

ALFRED M. ROBERTS.

REFERENCES CITED

The following references are of record in the file of this patent:

UNITED STATES PATENTS

| Number | Name | Date |
|---|---|---|
| 1,932,462 | Howlett | Oct. 31, 1933 |
| 2,011,623 | French | Aug. 20, 1935 |
| 2,175,497 | Wilbur | Oct. 10, 1939 |
| 2,206,614 | O'Hern | July 2, 1940 |
| 2,216,828 | Paque | Oct. 8, 1940 |